US006581425B1

(12) United States Patent
Brown et al.

(10) Patent No.: US 6,581,425 B1
(45) Date of Patent: Jun. 24, 2003

(54) SLIDING MEMBER SECURING MECHANISM FOR A CONTAINER

(75) Inventors: Roger L. Brown, Villa Park, CA (US); Clifford R. Ronnenberg, Sunset Beach, CA (US)

(73) Assignee: Haulaway Storage Containers, Inc., Stanton, CA (US)

(*) Notice: Subject to any disclaimer, the term of this patent is extended or adjusted under 35 U.S.C. 154(b) by 0 days.

(21) Appl. No.: 10/061,490

(22) Filed: Jan. 31, 2002

(51) Int. Cl.[7] .................................................. B62H 5/04

(52) U.S. Cl. ....................... 70/212; 70/211; 292/259 R; 292/259 A; 292/150; 292/DIG. 53; 292/DIG. 54

(58) Field of Search ............... 70/212, 211; 292/259 R, 292/259 A, 150, DIG. 53, DIG. 54

(56) References Cited

U.S. PATENT DOCUMENTS

| | | | | | |
|---|---|---|---|---|---|
| 755,551 | A | * | 3/1904 | Richardson | 160/199 |
| 1,215,752 | A | | 2/1917 | Walraven | |
| 1,266,086 | A | | 5/1918 | Wesolowski | |
| 1,474,158 | A | | 11/1923 | Moore | |
| 3,633,954 | A | * | 1/1972 | Tantlinger | 292/217 |
| 3,695,661 | A | * | 10/1972 | Pastva | 292/218 |
| 3,848,908 | A | | 11/1974 | Rich | |
| 3,917,328 | A | * | 11/1975 | De Filippi | 292/7 |
| 4,080,757 | A | | 3/1978 | Westerman | |
| 4,139,226 | A | | 2/1979 | Carman et al. | |
| 4,161,870 | A | * | 7/1979 | Barnes | 70/278 |
| 4,170,376 | A | * | 10/1979 | Banerjea | 292/218 |
| 4,232,891 | A | * | 11/1980 | Ringe | 292/218 |
| 4,486,132 | A | | 12/1984 | Schulz et al. | |
| 4,503,582 | A | | 3/1985 | Gurubatham | |
| 4,564,230 | A | * | 1/1986 | Haist | 292/218 |
| 4,601,499 | A | | 7/1986 | Kim | |
| 4,669,282 | A | * | 6/1987 | Hoyt et al. | 70/129 |
| 4,815,773 | A | * | 3/1989 | Merrell | 292/60 |
| 4,889,372 | A | * | 12/1989 | Dege et al. | 292/218 |
| 4,954,029 | A | | 9/1990 | Durkin | |
| 5,029,909 | A | | 7/1991 | Bunger | |
| 5,094,485 | A | | 3/1992 | Lycett | |
| 5,261,258 | A | | 11/1993 | Bunger | |
| 5,311,824 | A | | 5/1994 | Sauer et al. | |
| 5,507,539 | A | | 4/1996 | Basinski | |
| 5,509,700 | A | | 4/1996 | Kennedy, Jr. | |
| 5,553,904 | A | * | 9/1996 | Lorenzo | 292/307 R |
| 5,718,466 | A | * | 2/1998 | Weinerman et al. | 292/218 |
| 5,718,467 | A | * | 2/1998 | Weinerman et al. | 292/218 |
| 5,782,507 | A | | 7/1998 | Hardee | |
| 5,791,702 | A | * | 8/1998 | Liroff | 292/307 R |
| 5,802,892 | A | | 9/1998 | Cohn et al. | |
| 5,934,116 | A | * | 8/1999 | Moore | 70/212 |
| 6,085,928 | A | | 7/2000 | Dickinson et al. | |
| 6,113,163 | A | | 9/2000 | Liroff | |
| 6,357,266 | B1 | * | 3/2002 | Van Buren | 70/56 |

* cited by examiner

*Primary Examiner*—J. J. Swann
*Assistant Examiner*—Carlos Lugo
(74) *Attorney, Agent, or Firm*—Finnegan, Henderson, Farabow, Garrett & Dunner

(57) ABSTRACT

This invention pertains to a mechanism for securing a container. The container includes at least one wall, which is comprised of at least a first door. The mechanism includes a first rod, which is attached with the outer surface of the first door. The first rod is capable of being rotated from an openable position, when the first door is capable of being opened, to a closed position, when the first door is engaged with the container to be closed. The mechanism further includes a channel member, which is attached with the inner surface of the first door, and a sliding member, which is slidably received within the channel member. The sliding member is engageable with the first rod. As the first rod is rotated from the openable position to the closed position, engagement of the first rod with the sliding member causes the sliding member to slide to secure the first door. In one embodiment, a second door is provided, which is secured by inserting a pin attached with a bottom portion of the inner surface of the second door into a pin engaging hole defined in the floor of the container. In one embodiment, after the doors are secured, and a lock is inserted into padlock tabs of a locking device, the doors are prevented from being opened unless the lock is removed.

52 Claims, 8 Drawing Sheets

SLIDING MEMBER SECURING MECHANISM FOR A CONTAINER

DESCRIPTION OF THE INVENTION

Field of the Invention

This invention relates to a locking system for securing one or more doors of a container and, more particularly, to such a locking system including a sliding member securing mechanism.

BACKGROUND OF THE INVENTION

There are various types of containers that may be used to transport and/or store materials. One type of container is a cargo style shipping container. Cargo style shipping containers typically are rectangular in shape, and have four side walls, a top wall, and a bottom wall. While the size of cargo style containers may vary, there are two sizes of this type of container in general use: one size is about 8 feet in height, about 8 feet in width, and about 20 feet in length, and the other size is about 8 feet in height, about 8 feet in width, and about 40 feet in length.

Cargo style shipping containers may be used to transport large volumes of materials from location to location around the world. These large containers can store large quantities of materials and may be effectively transported on boats, trains, trucks, and the like in order to expeditiously arrive at their eventual destination. The detachability and adaptability of these containers is important because the containers will often changes hands from one carrier to another carrier, such as from a train to a trucking company or from a trucking company to a steamship line, during the transport.

Because of the great volume and often valuable nature of the materials transported within the container, security is an important consideration during the transport of the materials. Thus, these containers are usually sealed and/or locked in some manner to prevent an unauthorized person from gaining access into the container.

Another use of a cargo style shipping container is as a storage mechanism for additional storage space. For example, such a container could be used by a school, a hospital, a contractor, or the like to store materials on-site. Often, these containers are used only temporarily by such entities. As with the use of containers for transport, while in use for storage, the containers typically need to be securely locked to protect the materials within the container.

Generally, at least one wall of the container comprises a pair of doors, similar to doors on a barn, which may be opened or closed to gain or prevent access to the interior of the container, respectively. To close the container, a first door is swung closed, the second door is then swung closed, and the doors are locked. Each door is typically closed using an external latch rod having a handle. Movement of the handle in turn moves the external latch rod so that latches at the top and bottom of the latch rod engage with protrusions that protrude from the door frame at the top and bottom of the container. Then, after the doors are closed, at least one of the handles is locked in place, such as by using a padlock or other locking device, to lock the containers and prevent access to the interior of the container.

It is generally known in the art to protect the locking mechanism, such as a padlock, by the use of a protective cover. However, a person may sever the external latch rod, which would then allow access to the interior of the container and, thus, the materials within the container. More particularly, if the external latch rod is severed, an intruder may bypass the padlock and open the door by rotating the latch rod (which is then free of the handle) while the handle remains locked by the padlock. While protecting the locking mechanism prevents an intruder from gaining access to the container by tampering with the padlock, those types of improvements do not protect the securing mechanism (i.e., the external latch rod).

Thus, to better prevent unauthorized access to storage containers like those described above, a mechanism which protects the securing mechanism from tampering, as well as preventing tampering with the actual locking mechanism, is desired.

SUMMARY OF THE INVENTION

The present invention provides a mechanism for securing a container. The container includes at least one wall. The at least one wall includes at least a first door and a second door which has an inner surface and an outer surface.

The mechanism includes a first rod, which is attached with the outer surface of the first door. The first rod is capable of being rotated from an openable position, when the first door is capable of being opened, to a closed position, when the first door is engaged with the container to be closed. The mechanism includes a channel member, which is attached with the inner surface of the first door. The mechanism includes a sliding member slidably received within the channel member. The sliding member is also engageable with the first rod. As the first rod is rotated from the openable position to the closed position, engagement of the first rod with the sliding member causes the sliding member to slide to secure the first door.

In one embodiment, the at least one wall further comprises a second portion, and a portion of the sliding member slides behind an inner surface of the second portion to secure the first door. In one embodiment, the second portion is a second door.

In one embodiment, the container includes a first handle attached to the first rod. Movement of the first handle in turn rotates the first rod from the openable position to the closed position.

In one embodiment, the mechanism includes an engaging member for engaging the sliding member with the first rod. The engaging member is attached with the first rod when the first rod is in the closed position. In an exemplary embodiment, the engaging member is welded to the first rod.

In one embodiment, the mechanism includes a plate attached to the inner surface of the first door so that the channel member is attached to the plate to be attached with the inner surface of the first door. In an exemplary embodiment, the plate is attached to the inner surface of the first door using screws and the channel member is attached to the plate by welding.

In one embodiment, the mechanism includes a pair of tabs. One tab is attached with the outer surface of the first door and the other tab is attached with the first rod. Each tab defines an opening therein, and the openings defined in the tabs align with each other when the first rod is rotated to be in the closed position. A locking device may be inserted into the openings defined in the tabs to lock the first door in the closed position. In addition, a cover may be attached with the outer surface of the first door so as to cover the pair of tabs and the locking device.

In one embodiment, when the at least one wall comprises two doors, the mechanism includes a pin attached with a bottom portion of the inner surface of the second door and a pin engaging hole defined in a floor of the container. The pin is inserted into the pin engaging hole to lock the second door to the container.

The present invention also provides a method of securing a container. The container includes at least one wall that includes at least a first door. The first door includes an inner surface and an outer surface. The container includes a first rod. The first rod is attached with the outer surface of the first door. The first rod is capable of being rotated from an openable position, when the first door is capable of being opened, to a closed position, when the first door is engaged with the container to be closed. The container includes a channel member attached with the inner surface of the first door. The container also includes a sliding member slidably received within the channel member. The sliding member is engageable with the first rod.

The method comprises the step of rotating the first rod from the openable position to the closed position to slide the sliding member within the channel member to secure the first door.

In one embodiment, the at least one wall further comprises a second portion, and a portion of the sliding member slides behind an inner surface of the second portion to secure the first door. In one embodiment, the second portion is a second door.

In one embodiment, the container further includes an engaging member for engaging the sliding member with the first rod. The engaging member is attached with the first rod when the first rod is in the closed position. The step of rotating the first rod includes moving the engaging member to slide the sliding member within the channel member.

In one embodiment, when the at least one wall comprises two doors, the step of rotating the first rod is preceded by the step of locking the second door by inserting a pin attached with a bottom portion of the inner surface of the second door into a pin engaging hole defined in a floor of the container.

In one embodiment, the container further includes a pair of tabs. One tab is attached with the outer surface of the first door and the other tab is attached with the first rod. Each tab defines an opening therein, and the openings defined in the tabs align with each other when the first rod is rotated to be in the closed position. In this embodiment, the step of rotating the first rod is followed by the steps of inserting a locking device into openings defined in the pair of tabs; and locking the locking device. In one embodiment, the method then includes the step of placing a cover over the pair of tabs and the locking device.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention and together with the description, serve to explain the principles of the invention.

DESCRIPTION OF THE EMBODIMENTS

Reference will now be made in detail to the present embodiments of the invention, an example of which is illustrated in the accompanying drawings.

Figure 1:
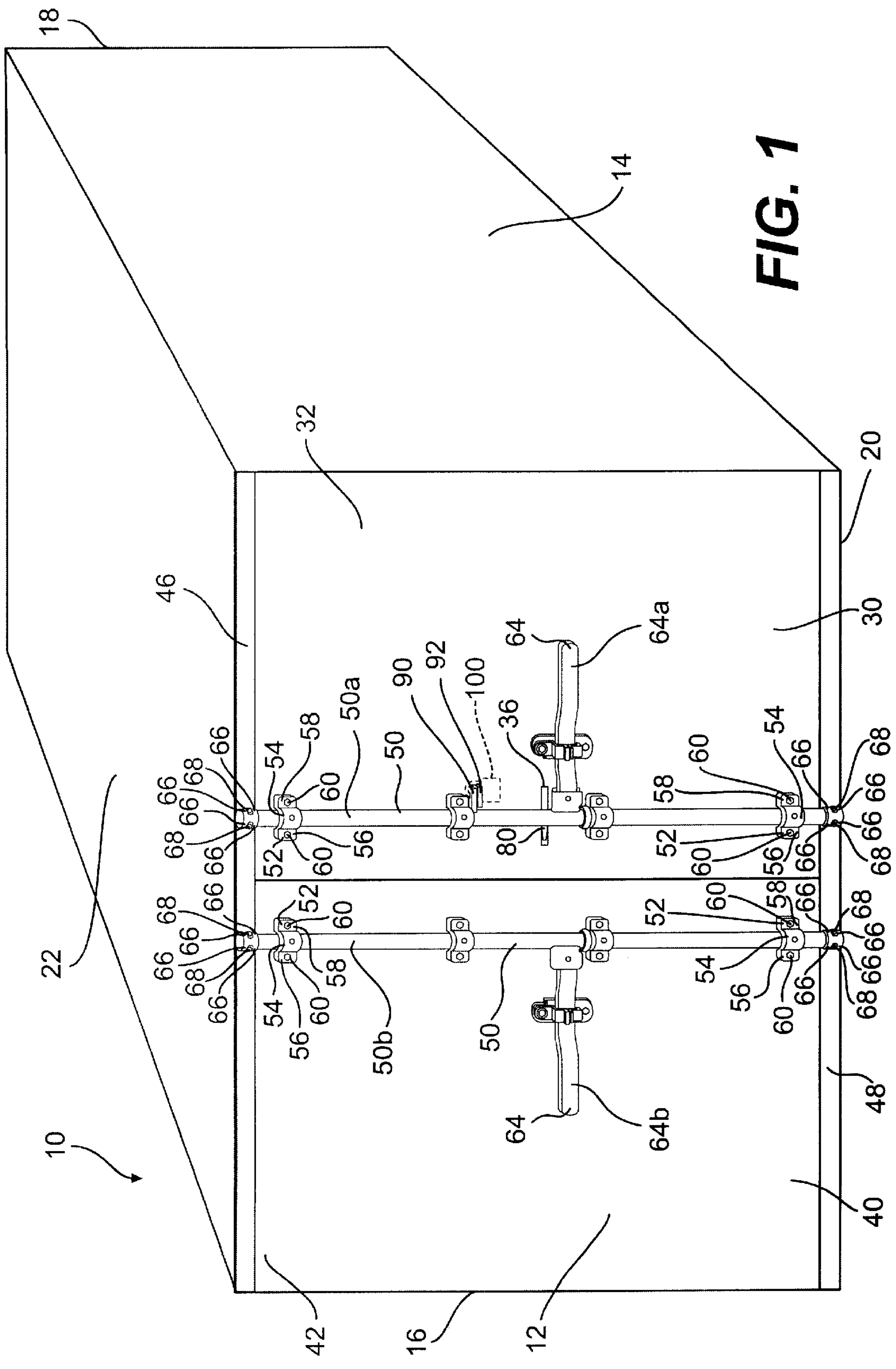
FIG. 1 is a perspective view of a container that includes one embodiment of the present invention.

FIG. 1 illustrates a perspective view of a container 10, such as a cargo style shipping container. The container 10 generally includes four side walls 12, 14, 16, 18, a bottom wall 20, and a top wall 22. The container 10 may comprise a variety of shapes and sizes. In one embodiment, the container 10 generally has a rectangular shape. With respect to cargo style shipping containers, there are generally two different sizes in use: one being about 8 feet in width, 8 feet in height, and 20 feet in length, and the other being about 8 feet in width, 8 feet in height, and 40 feet in length.

At least one of the side walls of the container 10 is capable of being opened to allow a person to gain access to the interior of the container 10. While, as shown in FIG. 1, it is side wall 12 that is openable to the interior, it should be noted that any one of the side walls 12, 14, 16, or 18, or even top wall 22 of the container 10 may be the wall that is capable of being opened to gain access to the interior of the container 10.

Figure 2:
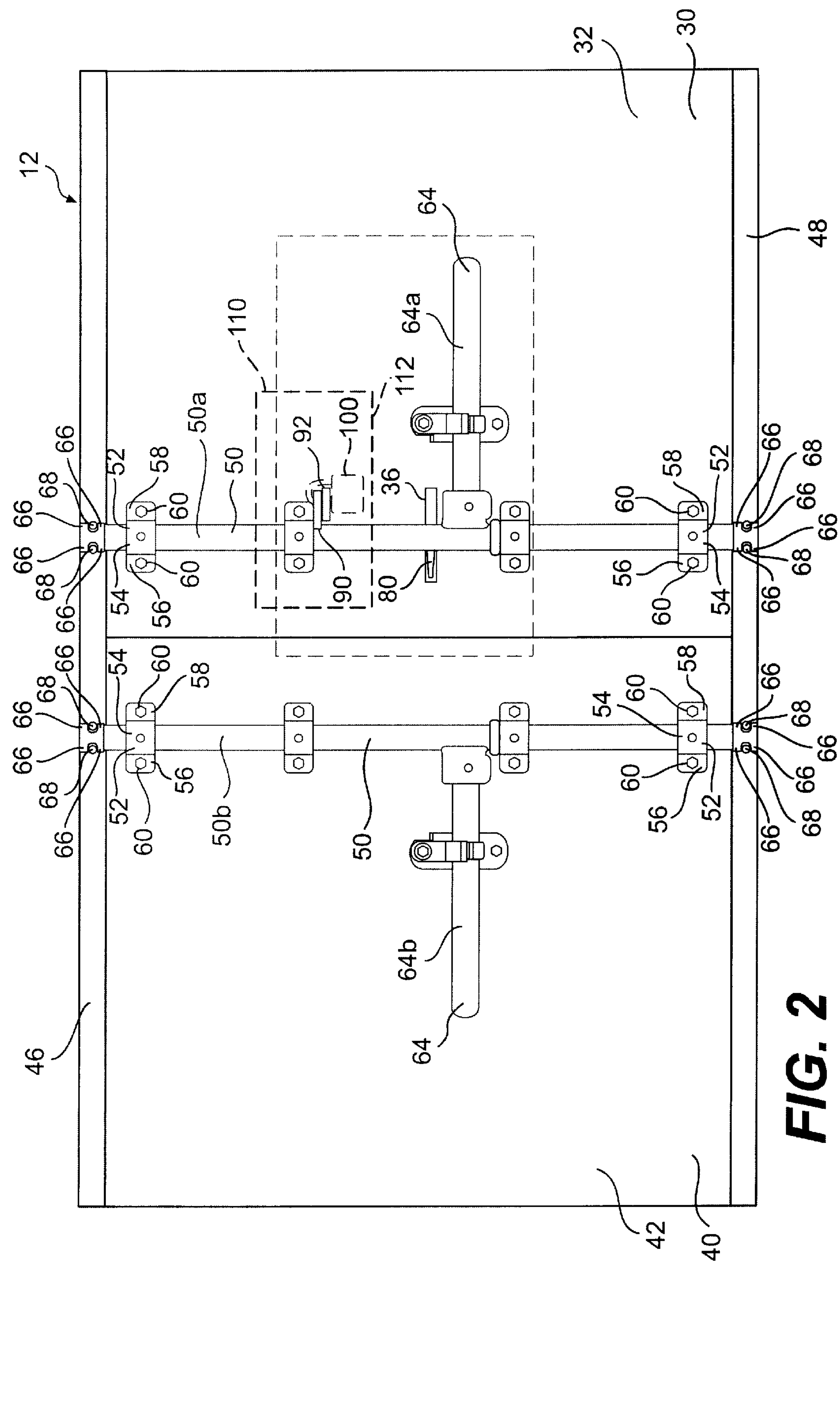
FIG. 2 is a plan view of the outer surface of one wall of the container depicted in FIG. 1.
Figure 3:
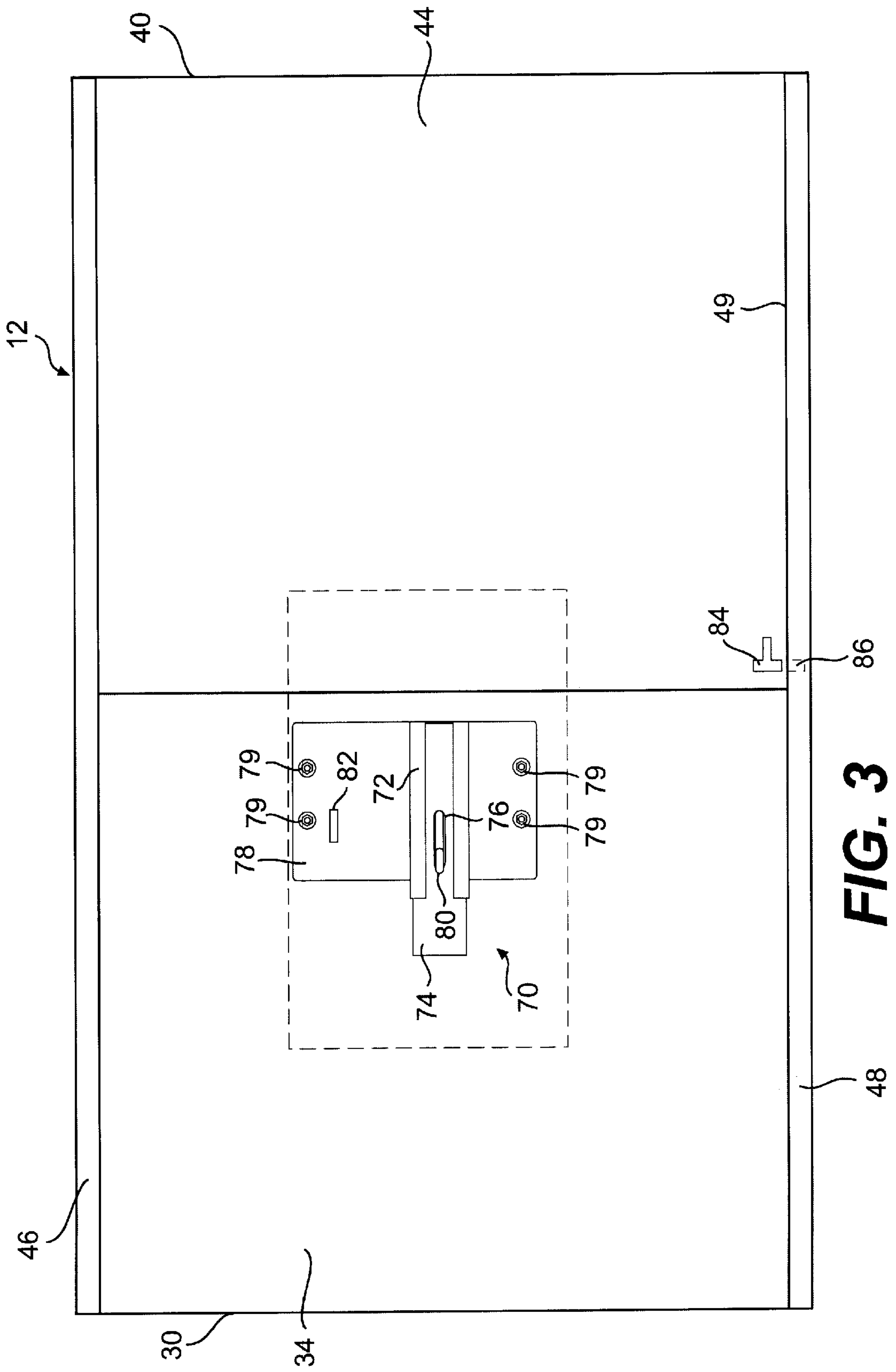
FIG. 3 is a plan view of the inside surface of the one wall depicted in FIG. 2.

FIG. 2 is a plan view of the outside of side wall 12 of the container 10, while FIG. 3 is a plan view of the inside of side wall 12. Side wall 12 includes at least one door 30 that is openable and closeable to gain and prevent, respectively, access to the interior of the container 10. In one embodiment, side wall 12 also includes a second portion 40. The second portion 40 may comprise a portion of side wall 12 that is fixed with respect to the other walls of container 10 and, thus, is not openable and closeable. The portion 40 may be fixed by a variety of means, such as by welding the portion 40 to the other walls of the container 10 or by other attachment mechanisms, such as screws, bolts, and the like.

In an alternative embodiment, the second portion 40 comprises a second door 40 so that side wall 12 is comprised of at least two doors, the first door 30 and the second door 40. While doors 30, 40 as shown are generally the same size, it should be appreciated that one of the doors may be larger in width and/or height than the other of the pair of doors. Doors 30, 40 are typically about 4 feet in width and 8 feet in height. Doors 30, 40 typically swing to the outside to gain access to the interior of the container 10, similar to doors on a barn.

Figure 4:
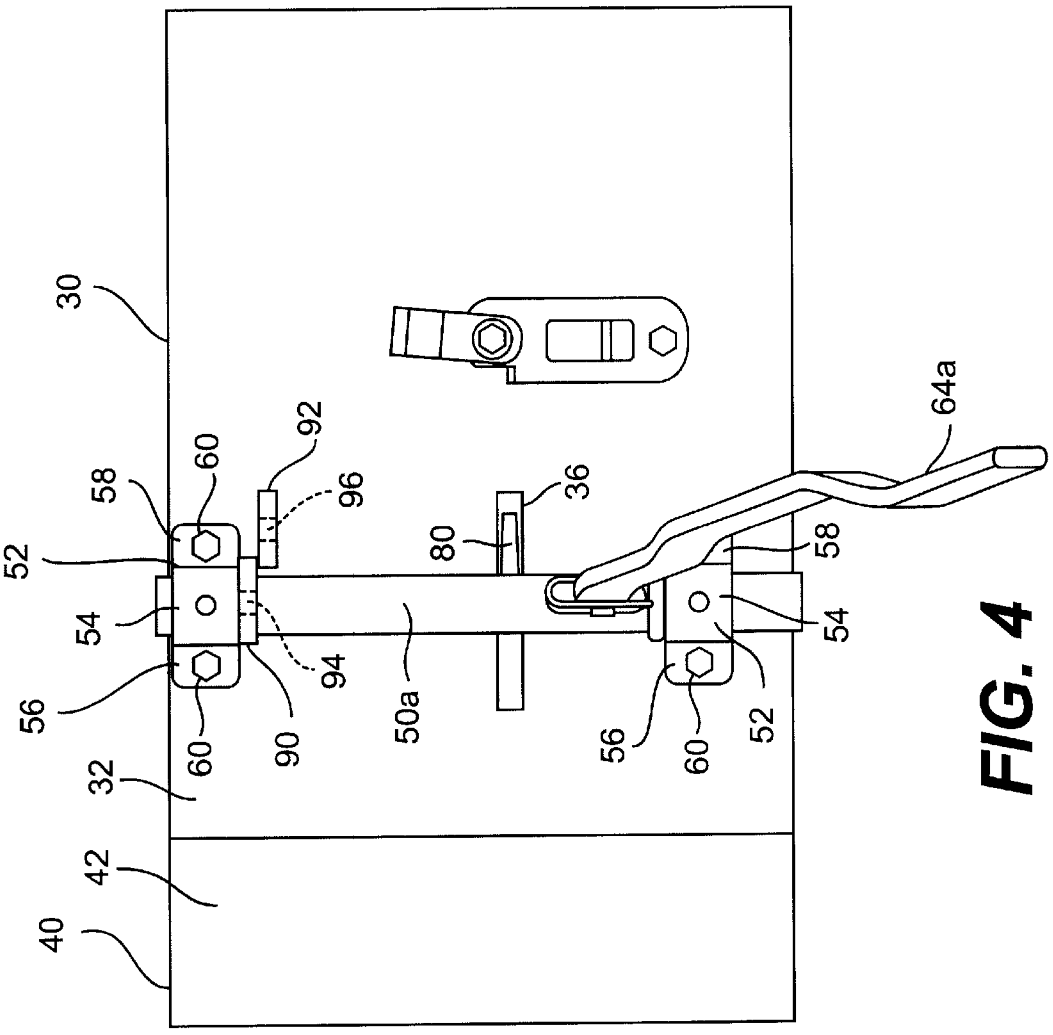
FIG. 4 is an enlarged view of a portion of the outer surface of the wall shown in FIG. 2, when the doors of the wall are in an openable position.
Figure 5:
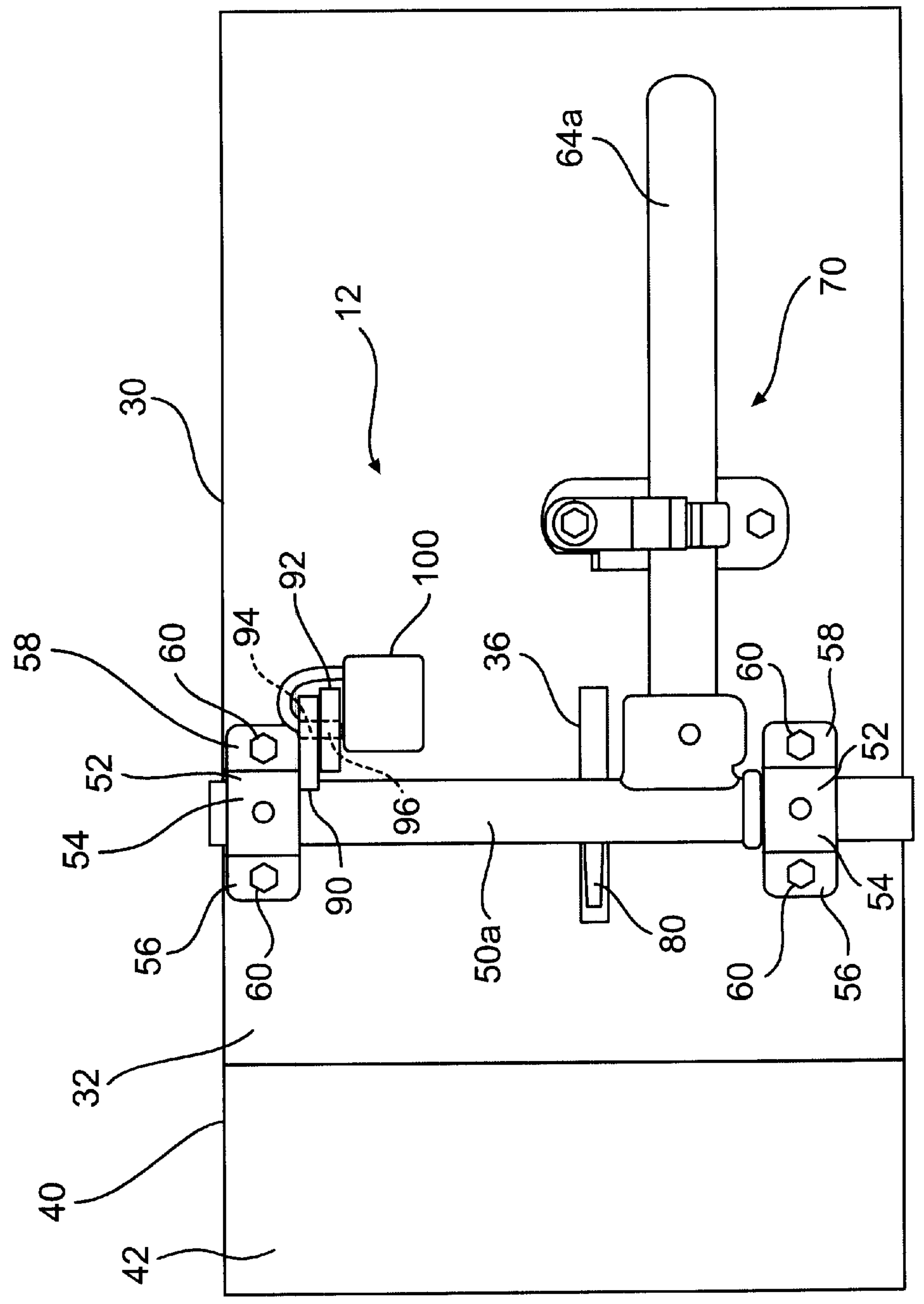
FIG. 5 is an enlarged view of a portion of the outer surface of the wall shown in FIG. 2, when the doors of the wall are in a closed position.
Figure 6:
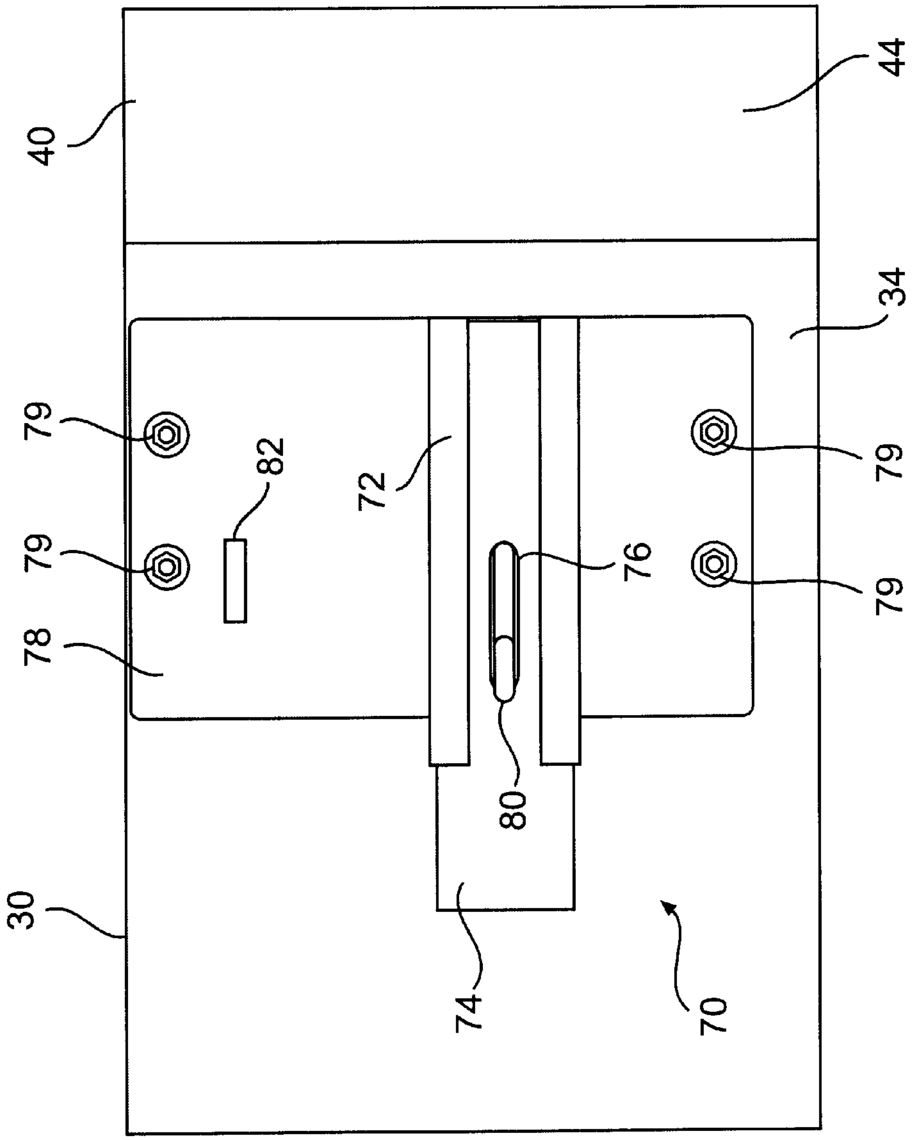
FIG. 6 is an enlarged view of a portion of the inside surface of the wall shown in FIG. 3, when the doors of the wall are in an openable position.
Figure 7:
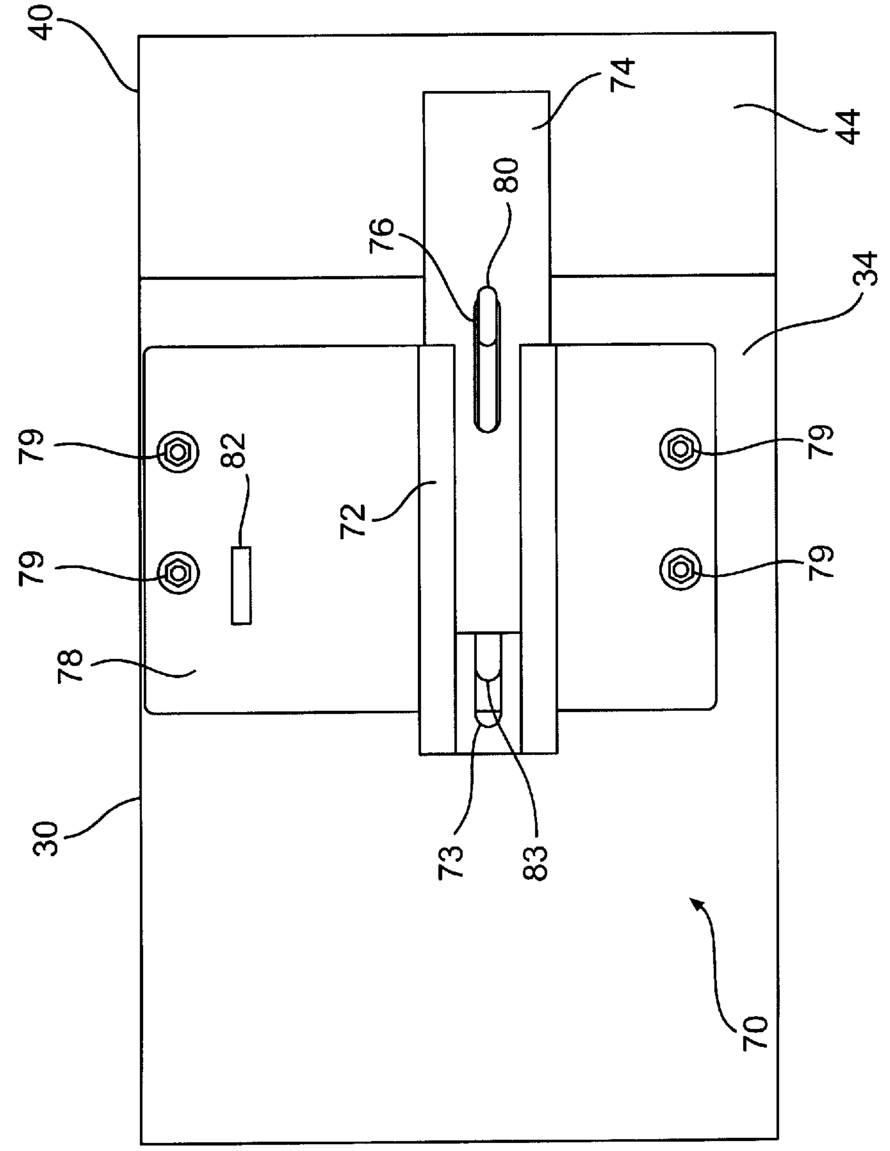
FIG. 7 is an enlarged view of a portion of the inside surface of the wall shown in FIG. 3, when the doors of the wall are in a closed position.

As shown in more detail in FIGS. 4–7, a sliding member securing mechanism 70 includes various components to allow doors 30, 40 to be secured together and then, using a locking mechanism, to securely lock container 10. FIGS. 4 and 5 illustrate a portion of outer surfaces 32, 42 of doors 30, 40, respectively, which is the dotted line portion of the outside of side wall 12 shown in FIG. 2. Similarly, FIGS. 6 and 7 illustrate a portion of inside surfaces 34, 44 of doors 30, 40, respectively, which is the dotted line portion of the inside of side wall 12 shown in FIG. 3. In addition, FIGS. 4 and 6 illustrate when doors 30, 40 are in an openable position, while FIGS. 5 and 7 illustrate when doors 30, 40 are in a closed position. It should be appreciated that although doors 30, 40 are not shown as opened in FIGS. 4 and 6, doors 30, 40 are capable of being opened at this point. In addition, it should be appreciated that while the components of the present invention are shown as part of door 30, which is the right door of wall 12 when viewed from outside the container 10, in the alternative, the components could also be part of door 40, the left door of wall 12.

As shown in FIGS. 1, 2, 4, and 5, door 30 includes an outer surface 32 and door 40 includes an outer surface 42. Similarly, as shown in FIGS. 3, 6, and 7, door 30 includes an inner surface 34 and door 40 includes an inner surface 44. As shown in FIGS. 1, 2, 4, and 5, door 30 also includes a opening 36 that extends through door 30 from inner surface 34 to outer surface 32. While opening 36 is shown as rectangular in shape, opening 36 may comprise other shapes, such as square or oval.

FIGS. 1, 2, 4, and 5 illustrate the components that are positioned on the outside of the container 10. In a conventional manner, with respect to both doors 30, 40 of side wall 12 of container 10, a vertically extending rod 50 is attached with each door 30, 40 such that rod 50 is rotatable relative to its respective door 30, 40 using a handle 64. As shown, door 30 is engageable with rod 50*a* and its handle 64*a*, while door 40 is engageable with rod 50*b* and its handle 64*b*. Each rod 50 may be attached with doors 30, 40 in a variety of ways, including using attachment mechanisms, such as bolts, screws, and the like, to allow the rod 50 to rotate. In one embodiment, each rod 50 is connected with doors 30, 40 using brackets 52 and attachment mechanisms 60.

As best shown in FIG. 1, each bracket 52 includes a half-circular section 54 and straight sections 56, 58. It should be appreciated that any number of brackets 52 may be utilized to attach each rod 50 with its respective door 30 or 40. As shown, four brackets 52 are utilized for each 50. For convenience, the middle two brackets 52 are not numbered in FIGS. 1 and 2. Each rod 50 is capable of fitting within each half-circular section 54. Each straight section 56, 58 defines an opening (not shown) therein. Attachment mechanisms 60, such as bolts or screws, fit into the openings of the sections 56, 58 to secure brackets 52 to doors 30, 40. Thus, after rod 50*a* is positioned next to outer surface 32 of door 30, brackets 52 are attached to door 30 such that rod 50*a* is positioned between brackets 52 and door 30. Rod 50*b* is attached with outer surface 42 of door 40 in a similar manner. After being attached with doors 30, 40 using brackets 52, each rod 50 is able to rotate relative to its respective door 30 or 40 within half-circular sections 54 of brackets 52.

By comparing FIGS. 4 and 5, it should be seen that at least handle 64*a* is movable in an arcuate manner, such that it is capable of swinging inward to and outward from outer surface 32 of door 30. In an exemplary embodiment, handle 64*b* is also movable in such an arcuate manner toward and outward from outer surface 42 of door 40. Because each handle 64 is fixed to its corresponding rod 50, the arcuate movement of each handle 64 in turn rotates its corresponding rod 50. In a conventional manner, rotation of each rod 50 allows the engagement of a cam mechanism positioned at the top and bottom of that rod 50 to secure each door 30 or 40 in the closed position relative to the container 10. Referring to FIGS. 1 and 2, in one embodiment, when each handle 64 is rotated which in turn rotates its corresponding rod 50, latches 66 that are positioned on the top and bottom of rods 50 engage with protrusions 68 that protrude outward from top door frame 46 and bottom door frame 48 of the container 10. This engagement of latches 66 with protrusions 68 of door frames 46, 48 of the container 10 closes doors 30, 40 of the container 10.

Referring to FIGS. 3, 6 and 7, the components of the sliding member securing mechanism 70, which are generally positioned on the inside of side wall 12 of container 10, will now be discussed. As shown in FIG. 3, in one embodiment, a heavy duty bolt or pin 84 is attached near a bottom portion of door 40 and a pin engaging hole 86 is defined in floor 49 of container 10. Once door 40 is closed after latches 66 engage with protrusions 68 of door frames 46, 48, door 40 may be secured by inserting the heavy duty pin 84 into the pin engaging hole 86.

Referring to FIGS. 3, 6, and 7, sliding member securing mechanism 70 includes a channel member 72 that is attached with inner surface 34 of door 30. Channel member 72 may be attached with inner surface 34 of door 30 through a variety of attachment mechanisms, such as by welding or by screws, bolts, and the like. In one embodiment (not shown), channel member 72 is welded to inner surface 34 of door 30. In an alternative embodiment, as shown in FIGS. 6 and 7, a plate 78 is first attached to inner surface 34 and then channel member 72 is attached to plate 78. As used herein, the term "attached with" encompasses direct and indirect attachments, while the term "attached to" encompasses a direct attachment.

Plate 78 is generally a reinforcing plate to strengthen the attachment of channel member 72 to inner surface 34 of door 30. Plate 78 may be attached to inner surface 34 of door 30 through a variety of attachment mechanisms, such as by welding or by screws, bolts, and the like. In one embodiment, as shown in FIGS. 6 and 7, plate 78 is attached to inner surface 34 using screws 79 inserted into openings (not shown) defined in plate 78, and channel member 72 is then welded to plate 78.

In addition, in the embodiment shown in FIG. 7, channel member 72 defines an opening 73 therein and plate 78 also defines an opening 83 therein. As shown, openings 73 and 83 are generally oval in shape. It should be appreciated that openings 73 and 83 may comprise other shapes and sizes, such as rectangular or square.

Channel member 72 is configured to allow a sliding member 74 to be slidably received within channel member 72. While sliding member 74 is shown as generally rectangular in shape, it should be noted that sliding member 74 may comprise other shapes and sizes, such as square or oval. In one embodiment, sliding member 74 is about twelve inches in length and about 3 inches in width.

Sliding member 74 defines an opening 76 therein. As shown, opening 76 is positioned in the center of sliding member 74 and is generally oval in shape. Opening 76 may comprise other shapes and sizes, such as rectangular or square.

Figure 8:
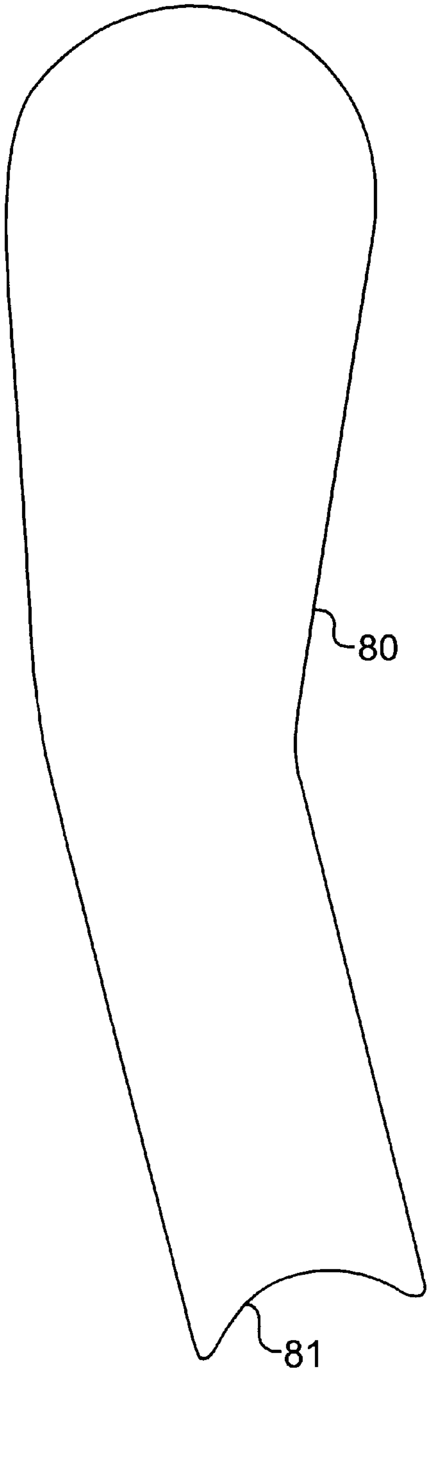
FIG. 8 is a plan view of one embodiment of an engaging member of the present invention.

Sliding member securing mechanism 70 also includes an engaging member 80 which engages sliding member 74 and is also attached with rod 50*a*. In one embodiment, engaging member 80 is comprised of a steel material. Engaging member 80 may be comprised of a variety of shapes and sizes. One embodiment of a shape of engaging member 80 is shown in FIG. 8. Engaging member 80 is attached by first inserting it through opening 36 of door 30 (and through opening 83 of plate 78, if present, and opening 73 of channel member 72) so that engaging member 80 engages sliding member 74 through opening 76 defined in sliding member 74. When rod 50*a* is in the closed position (FIG. 5), engaging member 80 is securely fixed to rod 50*a*. In one embodiment, a surface 81 of engaging member 80 is securely fixed to rod 50*a* by welding surface 81 of engaging member 80 to rod 50*a*. As discussed in more detail below, rotation of rod 50*a* (using handle 64*a*) in turn rotates engaging member 80 which in turn moves sliding member 74 with respect to inner surfaces 34, 44 of doors 30, 40, respectively.

As shown in FIGS. 1, 2, 4, and 5, in one embodiment, sliding member securing mechanism 70 includes a locking mechanism comprised of a pair of tabs 90, 92, that are utilized with a locking device 100. Tabs 90, 92 allow an operator to insert the padlock or other locking device 100 through them to lock doors 30, 40 of side wall 12 of the container 10. More particularly, in the closed position (FIG. 5), tabs 90, 92 are positioned such that openings 94, 96 defined therein, respectively, align with each other. Once these openings 94, 96 align with each other, an operator may insert the padlock or other locking device 100 through openings 94, 96 to enable doors 30, 40 to be locked together. In one embodiment, tab 90 is fixed to latch rod 50*a*, such as by welding, so that tab 90 aligns with tab 92 when door 30 is in its closed position. In one embodiment, tab 92 is fixed to outer surface 32 of door 30 such as by welding. In another embodiment, tab 92 is fixed to reinforcing plate 78 (at 82 in FIGS. 6 and 7) through an opening (not shown) defined in door 30 and extends outward from door 30. In one embodiment, tab 92 is welded to reinforcing plate 78.

In one embodiment, as shown in FIG. 2, a cover box 110 (shown in dotted lines) is fixed to outer surface 32 of door 30, such as by welding, so that tabs 90, 92 and locking device 100 are not accessible for tampering. In one embodiment, cover box 110 is comprised of a steel material. To access cover box 110, cover box 110 has an access hole at the bottom 112 thereof to enable the locking device 100 to be engaged by an operator.

The securing and locking of doors 30, 40 using sliding member securing mechanism 70 will now be discussed. Door 40 is first closed and locked in place. In particular, door 40 is closed by moving handle 64*b* towards door 40. The rotation of handle 64*b* toward door 40 rotates latch rod 50*b* so as to engage latches 66 that are positioned on the top and bottom of latch rod 50*b* with protrusions 68 protruding from top door frame 46 and bottom door frame 48. Referring to FIG. 3, after door 40 is closed, door 40 is locked by inserting heavy duty pin 84 into pin engaging hole 86 into floor 49 of container 10. Generally, an operator inserts heavy duty pin 84 into pin engaging hole 86 while he or she is inside the container 10. Once this is accomplished, the operator exits the container 10.

Once the operator exits the container 10, the other door 30 may be closed and locked. In the same manner as done with door 40, door 30 is closed by moving handle 64*a* toward door 30 from the openable position (FIG. 4) to the closed position (FIG. 5). The rotation of handle 64*a* toward door 30 rotates rod 50*a* so as to engage latches 66 that are positioned on the top and bottom of rod 50*a* with protrusions 68 protruding from top door frame 46 and bottom door frame 48.

In addition, the rotation of handle 64*a* causes at least a portion of sliding member 74, through engaging member 80, to slide behind inner surface 44 of door 40. More particularly, in the openable state shown in FIG. 6, sliding member 74 is only positioned behind door 30 and not door 40. Hence, door 30 is capable of being opened to gain access to the interior of container 10. As handle 64*a* is moved toward door 30 to the closed state shown in FIG. 7, rod 50*a* is rotated which in turn moves engaging member 80 attached with rod 50*a*. This movement of engaging member 80 in turn moves sliding member 74 because engaging member 80 engages sliding member 74 through opening 76. Thus, as shown in FIG. 7, once rod 50*a* is rotated to the closed position, sliding member 74 is positioned behind both doors 30, 40.

Using the sliding member securing mechanism 70 of the present invention, door 40 may not be opened because door 40 is locked in place, by inserting pin 84 into pin engaging hole 86. Then, because doors 30, 40 swing out to open, after sliding member 74 slides behind inner surface 44 of door 40, door 30 may also not be opened. In particular, if a would-be intruder tried to pull on door 30 from outside of container 10 to open door 30, door 30 will not open because a portion of sliding member 74 is positioned behind inner surface 44 of door 40, which again is locked.

The present invention may be retrofitted to an existing container. Such a retrofit would require minimal modification to the existing doors of the container. Referring to FIGS. 1–7, the modifications to door 30 would include cutting opening 36 for engaging member 80 and may include cutting an opening for tab 92 when tab 92 is fixed to plate 78. On inner surface 32 of door 30, the modifications may include attaching reinforcing plate 78 to inner surface 32, such as by screws or bolts; attaching channel member 72 to plate 78, if present, or inner surface 32, such as by welding; and positioning sliding member 74 within channel member 72. To complete the installation, engaging member 80 and tab 90 would be attached to rod 50*a*, such as by welding. Additionally, in one embodiment, a cover box 110 (see FIG. 2) may be attached with outer surface 34 of door 30, such as by welding, to cover padlock tabs 90, 92, and locking device 100. This cover box 110 is open at a bottom surface 112 thereof to allow the operator access to pair of tabs 90, 92 and locking device 100.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A mechanism for securing a container, the container including at least one wall, wherein the at least one wall of the container includes at least a first door, wherein the first door includes an inner surface and an outer surface, the mechanism comprising:

a first rod, wherein the first rod is attached with the outer surface of the first door, and wherein the first rod is capable of being rotated from an openable position, wherein the first door is capable of being opened, to a closed position, wherein the first door is engaged with the container to be closed;

a channel member attached with the inner surface of the first door; and a sliding member slidably received within the channel member, the sliding member being engageable with the first rod;

wherein as the first rod is rotated from the openable position to the closed position, engagement of the first rod with the sliding member causes the sliding member to slide to secure the first door.

2. The mechanism for securing a container of claim 1, wherein the at least one wall further comprises a second portion, wherein a portion of the sliding member slides behind an inner surface of the second portion to secure the first door.

3. The mechanism for securing a container of claim 2, wherein the second portion is a second door.

4. The mechanism for securing a container of claim 1, further comprising a first handle attached to the first rod, wherein movement of the first handle rotates the first rod.

5. The mechanism for securing a container of claim 4, further comprising a cam mechanism positioned on a top and a bottom of the first rod for engaging the first door to be closed with the container.

6. The mechanism for securing a container of claim 5, wherein the cam mechanism comprises latches positioned on a top and a bottom of the first rod, wherein the latches engage with protrusions protruding from a top door frame and a bottom door frame of the container, and wherein as the first handle rotates the first rod to the closed position, the latches engages with the protrusions to engage the first door to be closed with the container.

7. The mechanism for securing a container of claim 1, further comprising:

at least one latch positioned on a top and a bottom of the first rod; and at least one protrusion protruding from a top door frame and a bottom door frame of the container;

wherein as the first rod is rotated to the closed position, the latch engages with the protrusion to engage the first door to be closed with the container.

8. The mechanism for securing a container of claim 1, further comprising an engaging member for engaging the sliding member with the first rod.

9. The mechanism for securing a container of claim 8, wherein the engaging member is attached with the first rod.

10. The mechanism for securing a container of claim 1, further comprising an engaging member for engaging the sliding member with the first rod, wherein the engaging member is attached with the first rod;

wherein the sliding member defines a opening and wherein the engaging member engages the sliding member through the opening defined in the sliding member;

wherein the first door defines an opening;

wherein the channel member defines an opening; and wherein the engaging member is inserted through the opening defined in the first door and the opening defined in the channel member in order to engage the sliding member through the opening defined in the sliding member.

11. The mechanism for securing a container of claim 10, wherein the engaging member is attached with the first rod when the first rod is in the closed position.

12. The mechanism for securing a container of claim 11, wherein the engaging member is welded to the first rod when the first rod is in the closed position.

13. The mechanism for securing a container of claim 1, further comprising an engaging member for engaging the sliding member with the first rod, wherein the engaging member is attached with the first rod;

wherein the sliding member defines a opening and wherein the engaging member engages the sliding member through the opening defined in the sliding member;

further comprising a plate attached to the inner surface of the first door, wherein the channel member is attached to the plate to be attached with the inner surface of the first door;

wherein the first door defines an opening;

wherein the channel member defines an opening;

wherein the plate defines an opening;

and wherein the engaging member is inserted through the opening defined in the first door, then the opening defined in the plate and then the opening defined in the channel member in order to engage the sliding member through the opening defined in the sliding member.

14. The mechanism for securing a container of claim 13, wherein the engaging member is attached with the first rod when the first rod is in the closed position.

15. The mechanism for securing a container of claim 14, wherein the engaging member is welded to the first rod when the first rod is in the closed position.

16. The mechanism for securing a container of claim 13, wherein the plate is attached to the inner surface of the first door using screws and the channel member is attached to the plate by welding.

17. The mechanism for securing a container of claim 1, further comprising brackets to attach the first rod with the outer surface of the first door, wherein the brackets include half-circular sections and straight sections, wherein the first rod is capable of rotating within the half-circular sections of the brackets, and wherein the first rod is attached with the outer surface of the first door by positioning the first rod between the half-circular sections of the brackets and the outer surface of the first door and then attaching the brackets to the outer surface of the first door.

18. The mechanism for securing a container of claim 17, wherein the straight sections of the brackets define openings and the brackets are attached to the outer surface of the first door using attachment mechanisms that fit within the openings defined in the straight sections of the brackets.

19. The mechanism for securing a container of claim 1, further comprising a pair of tabs, wherein each tab defines an opening therein, and wherein the openings defined in the tabs align with each other when the first rod is rotated to be in the closed position;

wherein a locking device is capable of being inserted into the openings defined in the tabs to lock the first door in the closed position.

20. The mechanism for securing a container of claim 19, wherein one tab is attached with the outer surface of the first door and the other tab is attached with the first rod.

21. The mechanism for securing a container of claim 19, further comprising a cover, wherein the cover is attached with the outer surface of the first door so as to cover the pair of tabs and the locking device.

22. The mechanism for securing a container of claim 21, wherein the cover is open on a bottom of the cover to enable access to the pair of tabs and the locking device.

23. The mechanism for securing a container of claim 1, wherein the at least one wall further includes a second door and wherein the mechanism further comprises a pin attached with a bottom portion of an inner surface of the second door and a pin engaging hole defined in a floor of the container;

wherein the pin is capable of being inserted into the pin engaging hole to lock the second door to the container.

24. The mechanism for securing a container of claim 1, wherein the at least one wall further includes a second door, wherein the second door includes an inner surface and an outer surface, and wherein a portion of the sliding member slides behind the inner surface of the second door to secure the first door.

25. The mechanism for securing a container of claim 24, further comprising an engaging member for engaging the sliding member with the first rod;

wherein as the first rod rotates, the first rod moves the engaging member which in turn causes the sliding member to slide within the channel member.

26. The mechanism for securing a container of claim 25, wherein the engaging member is attached with the first rod when the first rod is in the closed position.

27. The mechanism for securing a container of claim 26, wherein the engaging member is welded to the first rod.

28. The mechanism for securing a container of claim 24, further comprising a pin attached with a bottom portion of the inner surface of the second door and a pin engaging hole defined in a floor of the container;

wherein the pin is capable of being inserted into the pin engaging hole to lock the second door to the container.

29. The mechanism for securing a container of claim 24, further comprising a plate attached to the inner surface of the first door, wherein the channel member is attached to the plate to be attached with the inner surface of the first door.

30. The mechanism for securing a container of claim 24, further comprising a pair of tabs, wherein each tab defines an opening therein, and wherein the openings defined in the tabs align with each other when the first rod is rotated to be in the closed position;

wherein a locking device is capable of being inserted into the openings defined in the tabs to lock the first door in the closed position.

31. The mechanism for securing a container of claim 30, wherein one tab is attached with the outer surface of the first door and the other tab is attached with the first rod.

32. The mechanism for securing a container of claim 30, further comprising a cover, wherein the cover is attached with the outer surface of the first door so as to cover the pair of tabs and the locking device.

33. The mechanism for securing a container of claim 32, wherein the cover is open on a bottom of the cover to enable access to the pair of tabs and the locking device.

34. The mechanism for securing a container of claim 1, wherein the at least one wall further includes a second door, wherein the second door includes an inner surface and an outer surface; the mechanism further comprising:

a pin attached with a bottom portion of the inner surface of the second door and a pin engaging hole defined in a floor of the container, wherein the pin is capable of being inserted into the pin engaging hole to lock the second door to the container;

an engaging member for engaging the sliding member with the first rod, wherein as the first rod rotates, the first rod moves the engaging member which in turn causes the sliding member to slide within the channel member, and wherein a portion of the sliding member slides behind the inner surface of the second door to secure the first door; and a pair of tabs, wherein one tab is attached with the outer surface of the first door and the other tab is attached with the first rod, wherein each tab defines an opening therein, wherein the openings defined in the tabs align with each other when the first rod is rotated to be in the closed position, and wherein a locking device is capable of being inserted into the openings defined in the tabs to lock the first door in the closed position.

35. The mechanism for securing a container of claim 34, further comprising a plate attached to the inner surface of the first door, wherein the channel member is attached to the plate to be attached with the inner surface of the first door.

36. The mechanism for securing a container of claim 34, further comprising a cover, wherein the cover is attached with the outer surface of the first door so as to cover the pair of tabs and the locking device.

37. A method of securing a container, the container including (a) at least one wall, wherein the at least one wall includes at least a first door, wherein the first door includes an inner surface and an outer surface; (b) a first rod, wherein the first rod is attached with the outer surface of the first door, and wherein the first rod is capable of being rotated from an openable position, wherein the first door is capable of being opened, to a closed position, wherein the first door is engaged with the container to be closed; (c) a channel member attached with the inner surface of the first door; and (d) a sliding member slidably received within the channel member, the sliding member being engageable with the first rod, comprising the step of:

rotating the first rod from the openable position to the closed position to slide the sliding member within the channel member to secure the first door.

38. The method of securing a container of claim 37, wherein the at least one wall further comprises a second portion, wherein a portion of the sliding member slides behind an inner surface of the second portion of the at least one wall to secure the first door.

39. The method of securing a container of claim 38, wherein the second portion is a second door.

40. The method of securing a container of claim 37, wherein the container further includes a first handle attached to the first rod for rotating the first rod.

41. The method of securing a container of claim 40, wherein latches are positioned on a top and a bottom of the first rod; and wherein protrusions protrude from a top door frame and a bottom door frame of the container; and wherein the step of rotating the first rod includes moving the first handle to rotate the first rod to engage the latches with the protrusions to engage the first door to be closed with the container.

42. The method of securing a container of claim 37, wherein latches are positioned on a top and a bottom of the first rod; and wherein protrusions protrude from a top door frame and a bottom door frame of the container; and wherein the step of rotating the first rod includes engaging the latches with the protrusions to engage the first door to be closed with the container.

43. The method of securing a container of claim 37, wherein the container further includes an engaging member for engaging the sliding member with the first rod, wherein the engaging member is attached with the first rod when the first rod is in the closed position; and wherein the step of rotating the first rod includes moving the engaging member to slide the sliding member within the channel member.

44. The method of securing a container of claim 37, wherein the at least one wall further includes a second door, and wherein the step of rotating the first rod is preceded by the step of locking the second door by inserting a pin attached with a bottom portion of an inner surface of the second door into a pin engaging hole defined in a floor of the container.

45. The method of securing a container of claim 44, wherein the container further includes a pair of tabs, one tab being attached with the outer surface of the first door and the other tab being attached with the first rod, wherein each tab defines an opening therein, and wherein the openings defined in the tabs align with each other when the first rod is rotated to be in the closed position;

wherein the step of rotating the first rod is followed by the steps of:

inserting a locking device into openings defined in the pair of tabs; and locking the locking device.

46. The method for securing a container of claim 45, further comprising the step of placing a cover over the pair of tabs and the locking device.

47. The method of securing a container of claim 37, wherein the container further includes a pair of tabs, one tab being attached with the outer surface of the first door and the other tab being attached with the first rod, wherein each tab defines an opening therein, and wherein the openings defined in the tabs align with each other when the first rod is rotated to be in the closed position;

wherein the step of rotating the first rod is followed by the steps of:

inserting a locking device into openings defined in the pair of tabs; and locking the locking device.

48. The method for securing a container of claim 47, further comprising the step of placing a cover over the pair of tabs and the locking device.

49. A method of securing a container, the container including (a) at least one wall that is capable of being opened to gain access to an interior of the container, wherein the at least one wall includes at least two doors comprising a first door and a second door, wherein each of the first and second doors includes an inner surface and an outer surface; (b) a first rod, wherein the first rod is positioned next to the outer surface of the first door and is attached with the outer surface of the first door; (c) a first handle attached with the first rod wherein arcuate movement of the first handle rotates the first rod from an openable position, wherein the first door is capable of being opened, to a closed position, wherein the first door is engaged with the container to be closed; (d) a second rod, wherein the second rod is positioned next to the outer surface of the second door and is attached with the outer surface of the second door; (e) a second handle attached with the second rod, wherein arcuate movement of the second handle rotates the second rod from an openable position, wherein the second door is capable of being opened, to a closed position, wherein the second door is engaged with the container to be closed; (f) a channel member attached with the inner surface of the first door; (g) a sliding member slidably received within the channel member, the sliding member being engageable with the first rod; (h) an engaging member that is attached with the first rod and is engageable with the sliding member; and (i) a pair of tabs, one tab being attached with the outer surface of the first door and the other tab being attached with the first rod, wherein each tab defines an opening therein, and wherein the openings defined in the tabs align with each other when the first rod is rotated to be in the closed position; comprising the steps of:

moving the second handle to rotate the second rod to close the second door to the container;

locking the second door;

moving the first handle to rotate the first rod to close the first door to the container, wherein rotation of the first rod moves the engaging member to slide the sliding member within the channel member so that a portion of the sliding member slides behind the inner surface of the second door;

inserting a locking device into the openings defined in the pair of tabs which are aligned; and locking the locking device.

50. The method of securing a container of claim 49, further comprising the step of placing a cover over the pair of tabs and the locking device.

51. The method of securing a container of claim 49, wherein the step of moving the second handle to rotate the second rod to close the second door includes engaging latches positioned at a top and a bottom of the second rod with protrusions protruding from a top door frame and a bottom door frame of the container; and wherein the step of moving the first handle to rotate the first rod to close the first door includes engaging latches positioned at a top and a bottom of the first rod with protrusions protruding from the top door frame and the bottom door frame of the container.

52. The method of securing a container of claim 49, wherein the step of locking the second door includes inserting a pin attached with a bottom portion of the inner surface of the second door into a pin engaging hole defined in a floor of the container.

* * * * *